United States Patent
Dewan et al.

(10) Patent No.: US 10,437,623 B2
(45) Date of Patent: Oct. 8, 2019

(54) FAST SWITCHING BETWEEN VIRTUAL MACHINES WITHOUT INTERRUPT VIRTUALIZATION FOR HIGH-PERFORMANCE, SECURE TRUSTED-EXECUTION ENVIRONMENT

(71) Applicant: INTEL IP CORPORATION, Santa Clara, CA (US)

(72) Inventors: Prashant Dewan, Hillsboro, OR (US); Vedvyas Shanbhogue, Austin, TX (US)

(73) Assignee: INTEL IP CORPORATION, Santa Clara, CA (US)

( * ) Notice: Subject to any disclaimer, the term of this patent is extended or adjusted under 35 U.S.C. 154(b) by 115 days.

(21) Appl. No.: 14/757,958

(22) Filed: Dec. 24, 2015

(65) Prior Publication Data

US 2017/0185435 A1    Jun. 29, 2017

(51) Int. Cl.
| | |
|---|---|
| G06F 9/455 | (2018.01) |
| G06F 9/46 | (2006.01) |
| G06F 9/48 | (2006.01) |
| G06F 9/50 | (2006.01) |

(52) U.S. Cl.
CPC .......... *G06F 9/45558* (2013.01); *G06F 9/485* (2013.01); *G06F 9/4831* (2013.01); *G06F 9/5077* (2013.01); *G06F 2009/45579* (2013.01); *G06F 2009/45583* (2013.01); *G06F 2009/45587* (2013.01); *G06F 2009/45591* (2013.01); *G06F 2209/542* (2013.01); *G06F 2209/548* (2013.01)

(58) Field of Classification Search
None
See application file for complete search history.

(56) References Cited

U.S. PATENT DOCUMENTS

| | | | | |
|---|---|---|---|---|
| 6,724,732 B1 * | 4/2004 | Abrams | .................. | H04L 47/10 370/252 |
| 7,302,511 B2 * | 11/2007 | Jeyasingh | ........... | G06F 9/45533 710/260 |
| 8,910,158 B2 * | 12/2014 | Neiger | ................ | G06F 9/30076 718/1 |
| 9,086,902 B2 * | 7/2015 | Konik | ................... | G06F 9/4881 |
| 2003/0101440 A1 * | 5/2003 | Hardin | .................. | G06F 9/4812 717/148 |

(Continued)

OTHER PUBLICATIONS

Dolan-Gavitt et al., "Virtuoso: Narrowing the Semantic Gap in Virtual Machine Introspection", 2011.*

(Continued)

*Primary Examiner* — Bradley A Teets

(57) ABSTRACT

Various embodiments are generally directed to an apparatus, method, and other techniques to handle interrupts directed to secure virtual machines. Work is added to a work queue in a shared memory buffer in accordance with a received request, and a task-priority register is updated to block interrupts not directed toward the secure virtual machine. A timer that expires after a number of cycles of the computer processor have elapsed is started. The secure virtual machine is launched on the computer processor, and a work queue in a shared memory buffer is polled for work to be executed by the secure virtual machine until the work queue is empty or until the timer expires.

25 Claims, 10 Drawing Sheets

(56) References Cited

U.S. PATENT DOCUMENTS

| | | | | |
|---|---|---|---|---|
| 2006/0075402 A1* | 4/2006 | Neiger | G06F 9/45558 | 718/1 |
| 2007/0106986 A1* | 5/2007 | Worley, Jr. | G06F 9/45537 | 718/1 |
| 2010/0262976 A1* | 10/2010 | Maruyama | G06F 9/462 | 718/108 |
| 2011/0161955 A1* | 6/2011 | Woller | G06F 9/4406 | 718/1 |
| 2011/0173329 A1* | 7/2011 | Zhang | G06F 1/3206 | 709/226 |
| 2011/0219374 A1* | 9/2011 | Mann | G06F 9/4418 | 718/1 |
| 2016/0292097 A1* | 10/2016 | Heisswolf | G06F 13/24 | |

OTHER PUBLICATIONS

AMD64 Virtualization Technology, "Secure Virtual Machine Architecture Reference Manual", 2005.*
Zhou et al., "Dynamic Tracking of Page Miss Ratio Curve for Memory Management", 2004.*
Wei et al., "Expanding an Operating System's Working Space with a New Mode to Support Trust Measurement", 2015.*
Van Doorn, "Hardware Virtualization Trends", 2006.*

* cited by examiner

500A

500B

500C

FAST SWITCHING BETWEEN VIRTUAL MACHINES WITHOUT INTERRUPT VIRTUALIZATION FOR HIGH-PERFORMANCE, SECURE TRUSTED-EXECUTION ENVIRONMENT

BACKGROUND

In many computer systems, a virtual machine may be used as a secure virtual machine for the execution of trusted software tasks or programs, such as secure financial transactions, authentication routines, or similar tasks that require security. Typically, most devices in the computer system that the secure virtual machine may need access to are also assigned to at least one other virtual machine and, therefore, must be shared between them. Only a few devices, such as a fingerprint reader, may be exclusively assigned to the secure virtual machine. In order to ensure that the secure virtual machine receives timely interrupts from the shred devices assigned to it, interrupts generated by those devices are virtualized such that each interrupt exits into a virtual-machine monitor, and the virtual-machine monitor then decides which virtual machine a given interrupt belongs to. The exiting into the virtual-machine monitor and subsequent injection of the appropriate interrupt is, however, a time- and power-consuming procedure that may consume approximately 3,000-4,000 processor cycles.

DETAILED DESCRIPTION

In various embodiments, when an interrupt is received from a device having work associated with a secure virtual machine, a work queue is created in a shared memory. The creation of the work queue may require an exit to a virtual-machine manager, but subsequent interrupts from the device are submitted to the work queue and may not require exiting to the virtual-machine manager, thus eliminating or reducing processing overhead involved with exiting to the virtual-machine manager on each subsequent interrupt. A task-priority register may be updated to filter interrupts from the device such that interrupts from the device to the secure virtual machine are passed while interrupts from the device or other devices to other virtual machines are blocked. In some embodiments, the task-priority register remains at the updated priority until the work queue is empty; in other embodiments, a timer is configured to start when the first work request is received and to expire after a number of cycles have elapsed. The task-priority register may, upon expiration of the timer, restore the previous priority. While the work queue is not empty and while the timer is not expired, however, the secure virtual machine polls the work queue for additional pending work.

As the term is used herein, "work" refers to a request from a device in a computer system for instructions to be run by a computer processor, data to be transferred by the computer processor, or any other such processing, data transfer, or other task. For example, a device may request that the processor receive input from a device, such as a keyboard, mouse, touchscreen, or fingerprint scanner; the device may similarly request that the processor send output to a device, such as a display, video driver, or similar device. The device may similarly request other functions, such as to control a bus (e.g., an I2C controller). Any device that raises interrupts is within the scope of the embodiments described herein, however, and the embodiments are not limited to any particular device or device type.

Figure 1:
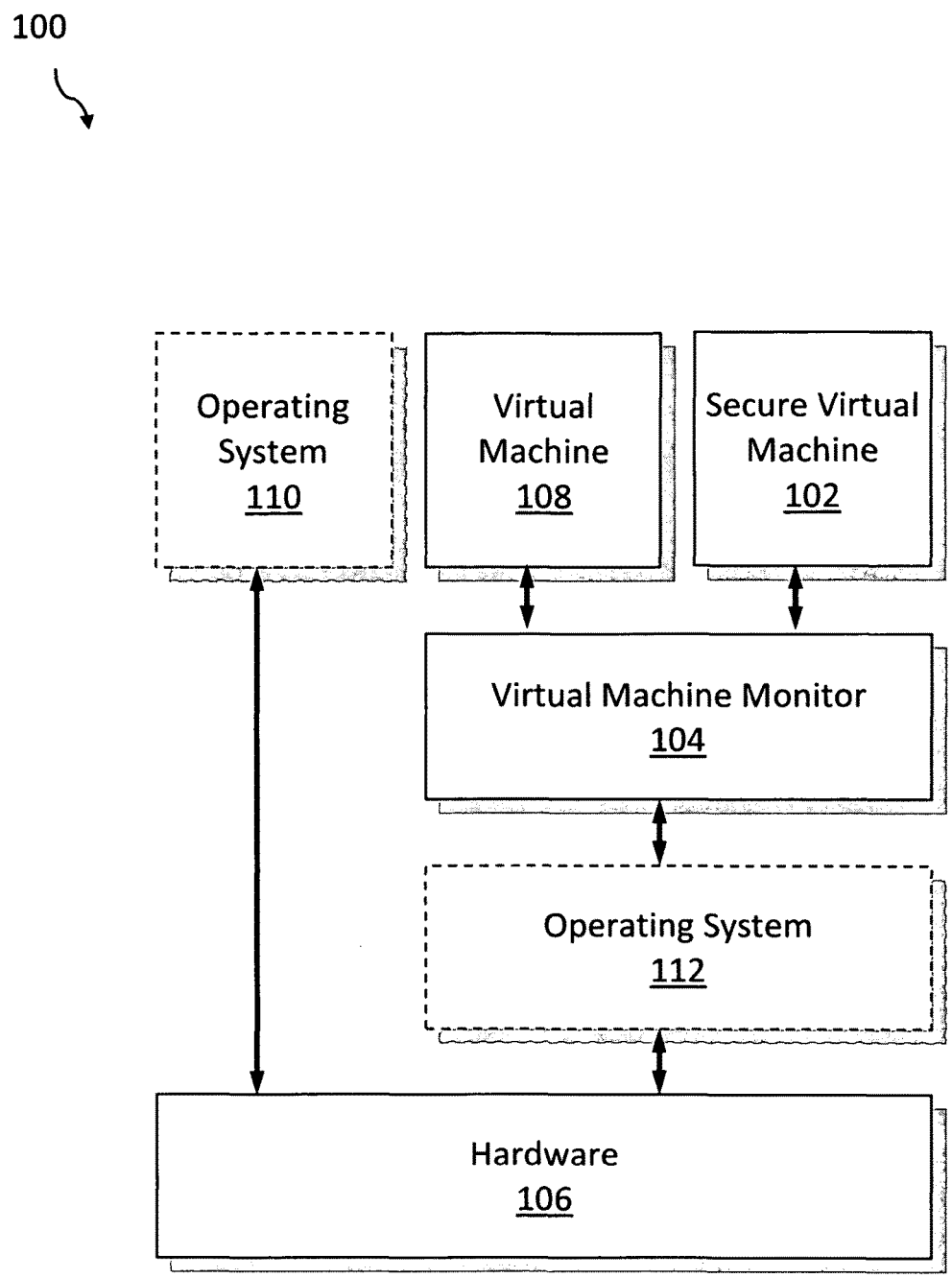
FIG. 1 illustrates an example embodiment of a virtual machine environment.

FIG. 1 illustrates a computing environment 100 that includes a secure virtual machine 102. The secure virtual machine 102 interacts with a virtual-machine monitor 104, also known as a hypervisor, that abstracts away hardware 106 from the secure virtual machine 102. The hardware 106, as explained in greater detail below, may include a processor, storage, input/output devices, etc. The virtual-machine monitor 104, as one skill in the art will understand, serves as an intermediary between the secure virtual machine 102 and the hardware 106 and presents the secure virtual machine 102 with a set of virtual hardware interfaces. The virtual-machine monitor 104 may be implemented in software, firmware, and/or hardware. One or more other virtual machines 108, or other secure virtual machines 102, may be executing at the same time as the secure virtual machine 102 using multiple processors or processor cores or by timesharing a processor or core.

The environment 100 may also include an operating system. In some embodiments, the virtual-machine monitor 104 interacts directly with the hardware 106—a so-called "bare metal" configuration—and the operating system, if it is present at all, exists at a level 110 on top of the virtual-machine monitor 104. In other embodiments, the operating system is present at a level 112 between the hardware 106 and the virtual-machine monitor 104. Any configuration of the operating system and virtual-machine monitor 106 is, however, within the scope of the embodiments described herein.

Figure 2:
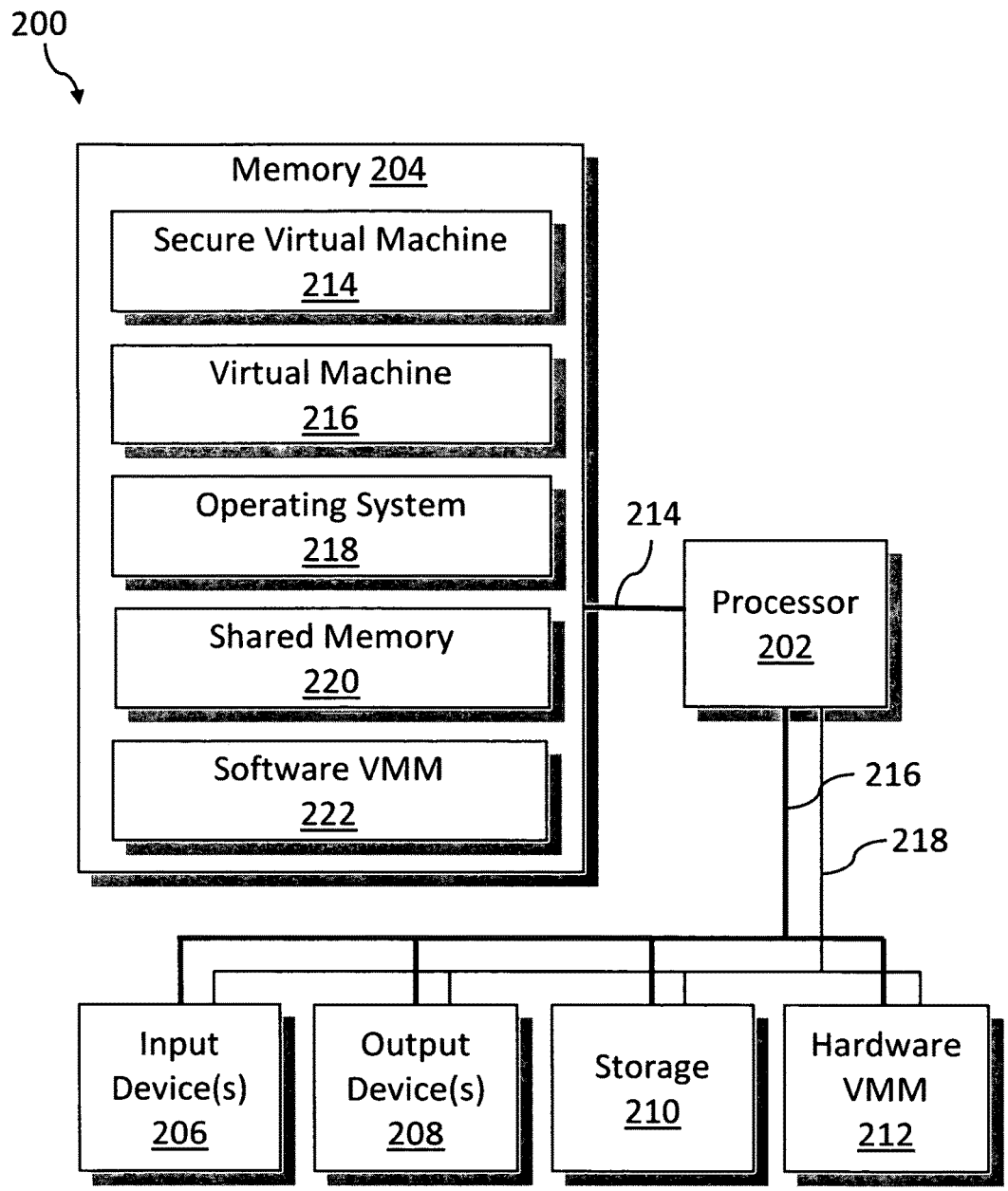
FIG. 2 illustrates an example embodiment of a computer system.

FIG. 2 illustrates a computing system 200 in accordance with embodiments described herein. A computer processor 202 is in electrical communication with a memory 204 and other devices, such as input device(s) 206, output device(s) 208, storage device(s) 210, a hardware virtual-machine monitor 212 (which may be used in lieu of or in parallel with a software virtual-machine monitor 222 described below), and any other devices known in the art. The processor 202 and memory 204 may communicate over a memory bus 214 or using any other means. The processor 202 and other devices 206-212 may communicate over a system bus 216, which may be the same or different from the memory bus 214. In addition, the devices 206-212 may communicate interrupt requests to the processor 202 via interrupt request lines 218, which may be discrete lines or integrated into the system bus 216.

The processor 202 may be any type of processing circuit such as a central-processing unit, digital-signal processor, application-specific integrated circuit, or similar processor, and may include one or more units, cores, or co-processors, some or all of which may operate in a low-power mode. The memory 204 may be any type of volatile storage, such as random-access memory (e.g., DDR memory), read-only memory, or any other type of memory. The input device(s) 206 may include a keyboard, mouse, touchscreen, microphone, fingerprint reader, or any other similar input device. The output device(s) 208 may include a display such as an LCD monitor, a touchscreen, a speaker, or any other similar output device. The storage 210 may be any type of non-volatile storage, such as magnetic hard disk drive, solid-state hard disk driver, flash memory, or similar non-volatile storage or removable media such as a CD, DVD, or USB flash drive.

The memory 204 may be used to store instructions to be executed by the processor 202, conceptually illustrated as a group of components. These components may generally include a secure virtual machine 214, a virtual machine 216, and an operating system 218 (e.g., a Microsoft WINDOWS, Linux, ANDROID, APPLE IOS, or APPLE OS X operating system) that may direct the execution of low-level, basic system functions (such as memory allocation, file management, and the operation of mass storage devices), as well as higher-level application routines. In other embodiments, some or all of these functions are performed by the hardware virtual-machine monitor 212 and/or the software virtual machine monitor 222. The operating system 218 may instead or in addition execute within a virtual machine 216 or secure virtual machine 214. The memory 204 may also include a shared memory 220, which may include memory space accessible jointly by the secure virtual machine 214, virtual machine 216, and/or operating system 218. The memory 204 may further include a virtual-machine manager 222 implemented wholly or partially in software. The various components may be programmed in any suitable programming language, including, without limitation high-level languages such as C, C++, Java, Perl, Python, or Ruby or low-level assembly languages. The volatile storage 204 may further store input and/or output data associated with execution of the instructions as well as additional information used by the various application routines.

Figure 3:
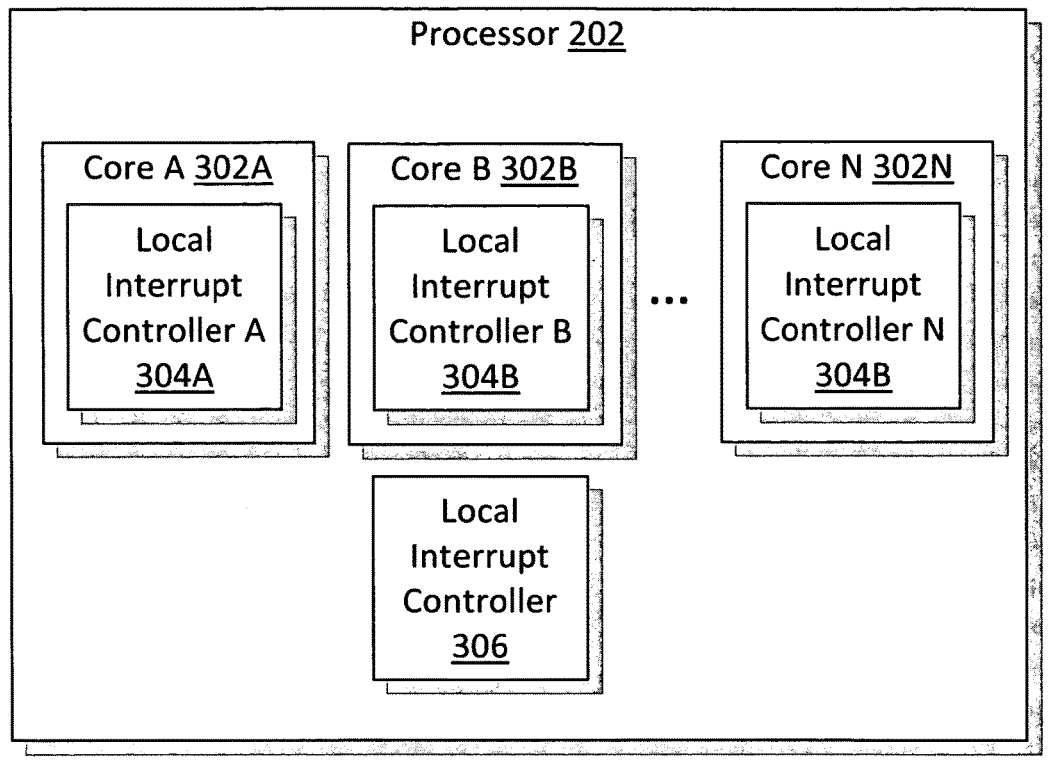
FIG. 3 illustrates an example embodiment of a processor.

FIG. 3 illustrates further details of the processor 202. In some embodiments, the processor 202 is a single-core processor, wherein "core" refers to an execution unit of the processor that executes instructions fetched and decoded from the memory 204 (in some instances, via or from the storage 210). In some embodiments, the processor 202 includes cores 302A, 302B . . . ; in other embodiments, the processor 202 includes N cores, where N is any number. One of skill in the art will understand that the embodiments disclosed herein are not limited to processors having any number of cores.

In various embodiments, the processor 202 and/or cores 302A, 302B, . . . include one or more local interrupt controllers, such as the Local Advanced Programmable Interrupt Controllers ("LAPICs") provided by INTEL CORPORATION of Beaverton, Oreg. In some embodiments, each core 302A, 302B, . . . has its own local interrupt controller 304A, 304B, . . . ; in other embodiments, a processor interrupt controller 306 handles interrupts for one or more cores 302A, 302B, . . . instead of or in addition to the local interrupt controllers 304A, 304B, . . . . Any combination or allocation of interrupt controllers is, however, within the scope of the embodiments described herein. Each local interrupt controller 306, 304A, 304B, . . . may include a task-priority register as explained in greater detail below.

Figure 4:
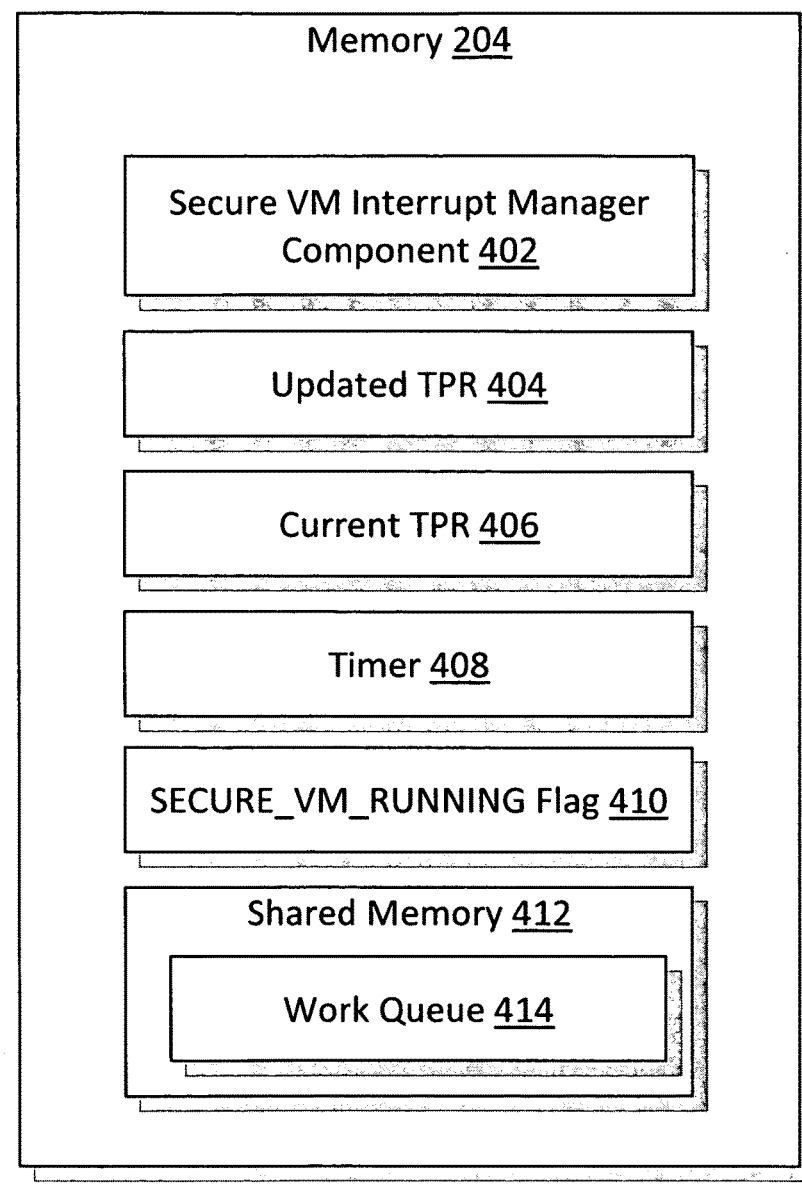
FIG. 4 illustrates an example embodiment of a computer memory.

FIG. 4 illustrates one embodiment of the memory 204 in accordance with embodiments described herein. As described further below, the memory 204 may include a secure virtual machine manager component 402, an updated task-priority register 404, a current task-priority register 406, a timer 408, a SECURE_VM_RUNNING flag 410, and a shared memory 412, which may include a work queue 414.

Figure 5A:
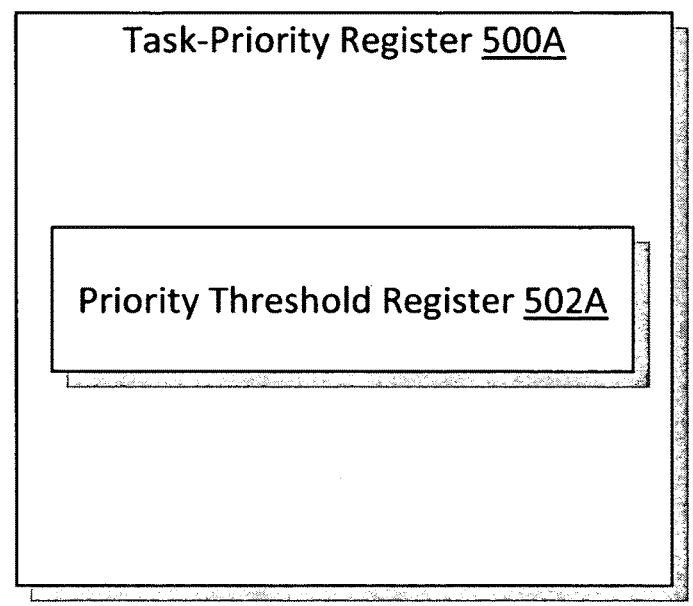
FIGS. 5A, 5B, and 5C illustrate example embodiments of and interrupt controller.
Figure 5B:
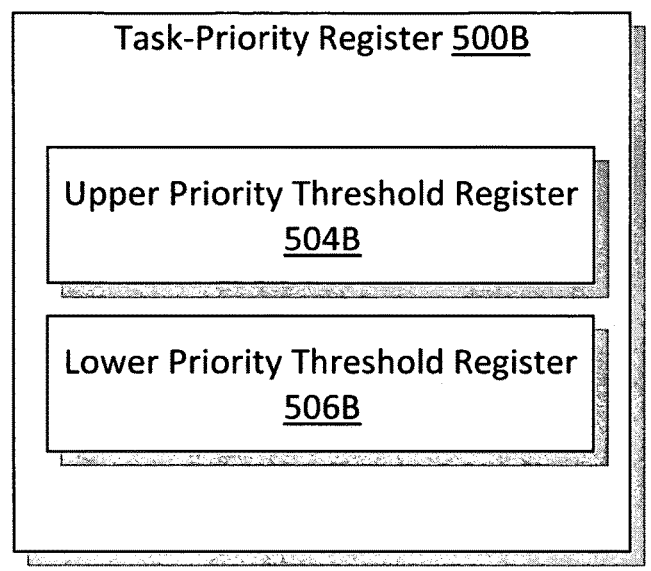
Figure 5C:
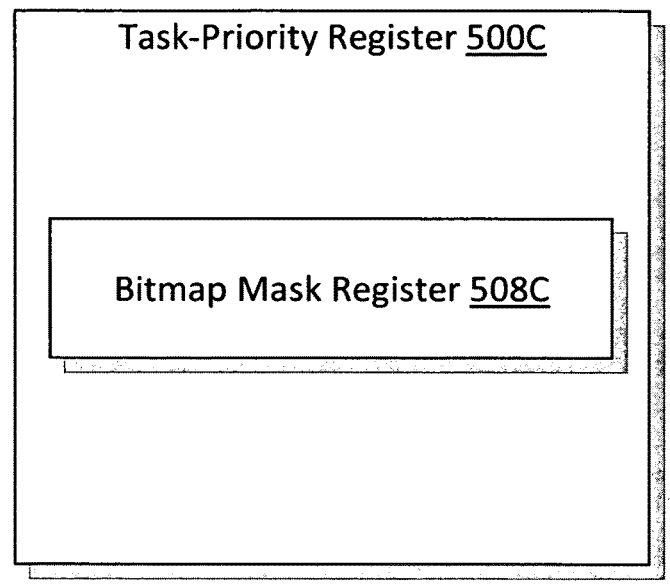

FIGS. 5A, 5B, and 5C illustrate task-priority registers 500A, 500B and 500C, respectively, in accordance with embodiments described herein. Referring to FIG. 5A, the task-priority register 500A includes a priority threshold register 502A; a priority of an interrupt may be compared to the priority specified by the priority threshold register 502A and, if the priority of the interrupt is greater than the priority specified by the priority threshold register 502A, the interrupt is permitted to pass and its associated work to execute on a processor. If, however, the priority of the interrupt is less than or equal to the priority specified by the priority threshold register 502A, the interrupt is blocked until higher-priority interrupts, if any, have finished executing. For example, if the priority specified by the priority threshold register 502A is set to "10," interrupts having a priority of 11 or more are permitting to pass, and interrupts having a priority of 10 or lower are blocked. Blocked interrupts may be held in a queue until they are executed.

Referring to FIG. 5B, the task-priority register 500B includes an upper priority threshold register 504B and a lower priority threshold register 506B. In some embodiments, an interrupt is permitting to pass and have its associated work execute on a processor only if the priority of the interrupt is greater than the priority specified by the lower priority threshold register 506B but less than the priority specified by the upper priority threshold register 504B. For example, if the priority specified by the lower priority threshold register 506B is set to "10" and if the priority specified by the upper priority threshold register 506B is set to "12," interrupts having a priority of 11 are allowed to pass while interrupts having a priority of 10 or less or 12 or more are blocked.

Referring to FIG. 5C, the task-priority register 500C includes a bitmap mask register 508C. In some embodiments, the bitmap mask register 508C contains bitmaps corresponding to specific interrupt numbers and/or groups of specific interrupt numbers. The bitmap mask register 508C masks incoming interrupts and either allows or blocks them, depending on the design choice of the bitmap mask register 508C, if the priority of the interrupt matches a bitmap in the bitmap mask register 508C. The interrupts allowed or blocked by the bitmap mask register 508C may have non-contiguous priorities. For example, the bitmap mask register 508C may contain bitmaps corresponding to priorities 4, 9, and 14, and interrupts having these priorities may be either allowed or blocked.

Figure 6:
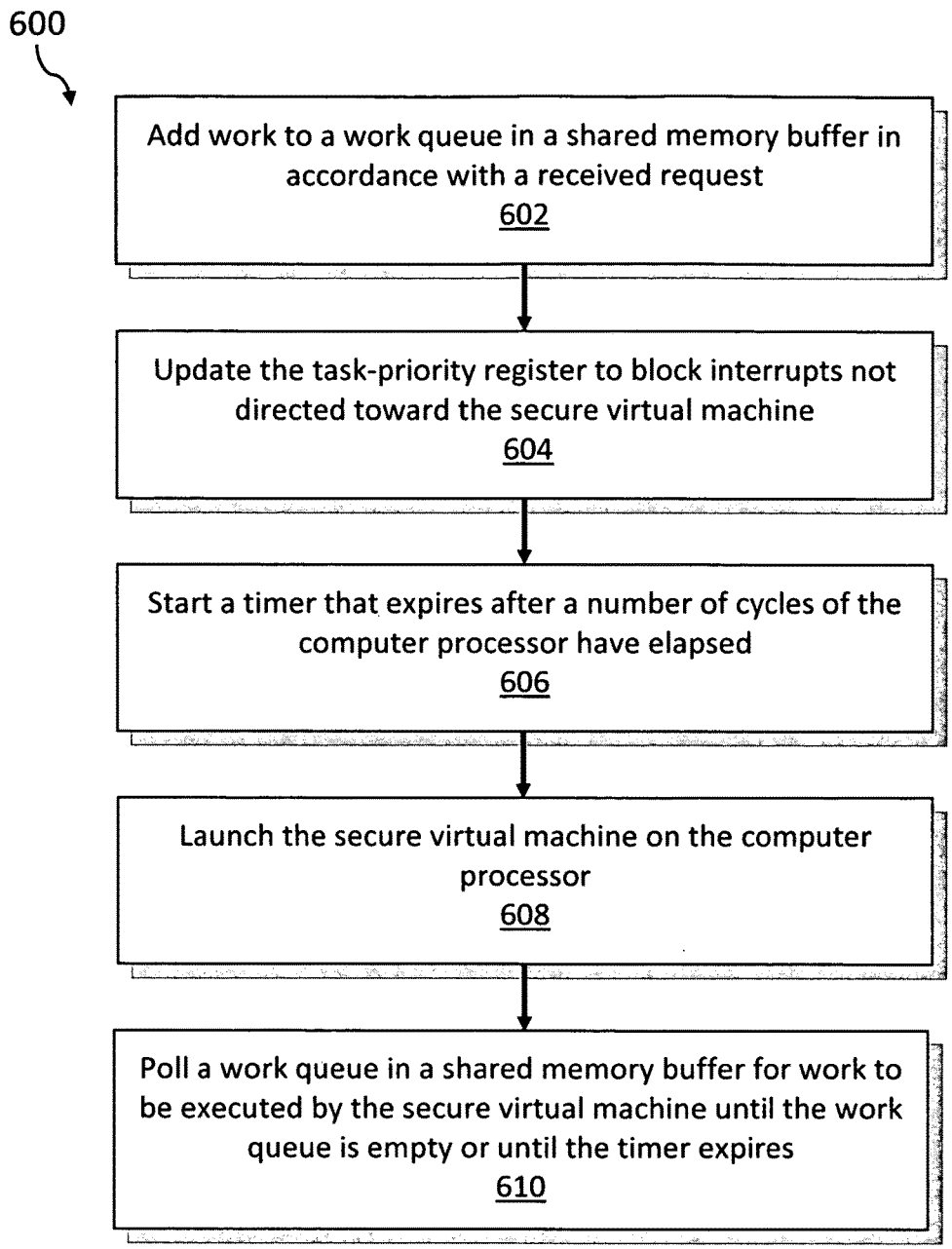
FIG. 6 illustrates a method for handling secure virtual-machine interrupts.

With reference also to the above figures, FIG. 6 illustrates a flow diagram 600 in accordance with embodiments of the present invention. As mentioned above, when a request for secure-virtual-machine processing, such as an interrupt, is received, work associated with the request is added (602) to a work queue, such as the work queue 414 described above with reference to FIG. 4, which resides in a shared memory, such as the shared memory 412. The work request and/or interrupt may be generated by an input device, such as an input device 206, by an output device, such as an output device 208, by a storage device, such as storage 210, by an operating system, such as operating system 218, or by any other device or system; the embodiments described herein are not limited to any particular system or method for generating work requests and/or interrupts. In some embodiments, a device such as a fingerprint reader is assigned to a secure virtual machine and generates an interrupt and associated work request when it receives user input (e.g., a fingerprint). The work may be added to the work queue 414 by a virtual-machine monitor, such as the hardware virtual-machine monitor 212 and/or software virtual machine monitor 222, by the operating system 218, by the secure virtual machine manager component 402, or by any other system or method.

The hardware virtual-machine monitor 212, software virtual machine monitor 222, secure virtual machine manager component 402, and/or operating system 218 updates (604) the task-priority register to block interrupts not directed toward the secure virtual machine. As mentioned above with reference to FIGS. 5A, 5B, and 5C, the task-priority register may include a priority threshold register 502A, a pair of upper and lower priority threshold registers 504B, 506B, and/or a bitmap mask register 508A. The updated task-priority register may be stored in a slot 404 in the memory 204; the current (i.e., pre-updated) task-priority register may be stored in a different slot 406. Updating the task-priority register 500A may include writing a higher priority into the priority threshold register 502A. The higher priority may be higher than the priority of interrupts assigned to other virtual machines, such as the virtual machine 216 of FIG. 2, but lower than the priority of interrupts assigned to the secure virtual machine 214, thereby allowing interrupts intended for the secure virtual machine 214 to pass while blocking interrupts intended for the virtual machine 216 or any other virtual machine or operating system. For example, interrupts assigned to the secure virtual machine 214 may have priorities of 10 or higher while interrupts assigned to the virtual machine 216 may have priorities of 9 or lower. In this example, the priority threshold register 502A is updated to have a priority of 9. In various embodiments, the secure virtual machine manager component 402, virtual machine manager, or operating system assigns a high priority to the interrupts of any device that may be associated with or otherwise submit work to a secure virtual machine.

In other embodiments, the task-priority register is the task-priority register 500B of FIG. 5B and is updated to have a new upper priority and/or lower priority. Before updating, only the lower priority threshold register 506B may be set with a priority, and the task-priority register 500B may function like the task-priority register 500A of FIG. 5A in that it blocks interrupts having a priority lower than or equal to the priority of the lower priority threshold register 506B. In other embodiments, before updating, both the lower priority threshold register 506B and upper priority threshold register 506B are set with priorities. During updating, the lower priority threshold register 506B and/or upper priority threshold register 504B may be set to different values. In some embodiments, the priority of the lower priority threshold register 506B is increased; in other embodiments, the priority of the lower priority threshold register 506B is increased and the priority of the upper priority threshold register 504B is set or decreased. For example, before updating, the priority of the lower priority threshold register 506B may be "1" and the priority of the higher priority threshold register 504B may be undefined or set to a maximum value to thereby allow all interrupts to pass. During updating, in this example, the priority of the lower priority threshold register 506B may be set to "9" and the priority of the higher priority threshold register 504B may be set to "11" to thereby allow interrupts to the secure virtual machine having a priority of 10 while blocking other interrupts having a value less than or greater than 10.

In still other embodiments, the task-priority register is the task-priority register 500C of FIG. 5C and is updated to have a new or different bitmap mask to mask interrupts not intended for the secure virtual machine. Any such bitmap mask register is within the scope of the present invention, as is any other hardware or software circuit or program capable of being programmed with a set of interrupt priorities and filtering interrupts based on the set of interrupt priorities. The task-priority registers 500A, 500B, 500C of FIGS. 5A, 5B, 5C need not be mutually exclusive; in some embodiments, for example, the task-priority register 500A is used when a secure virtual machine is not running and/or not receiving interrupts and the task-priority registers 500A or 500B are used when a secure virtual machine is running and/or is receiving interrupts.

A timer 408 is started (606) that expires after a number of cycles of the computer processor have elapsed. The timer 408 may be implemented in hardware and/or software. In some embodiments, the timer is started using a virtual-machine extension command, such as a VMX command. The timer 408 may place an upper bound on how long the secure virtual machine may execute using the updated task-priority register in order to ensure that other interrupts, such as interrupts directed toward the virtual machine 216, do not remain blocked for so long that the virtual machine 216 is starved of input data and/or overflows with output data. The number of cycles may be any number; in some embodiments, the number of cycles is 5,000, 10,000, or 50,000 cycles. The number of cycles may be selected by determining an average number of cycles of typical secure virtual-machine executing, by determining how many cycles, on average, a typical virtual machine can tolerate having blocked interrupts, or by any other means. In some embodiments, the number of cycles is dynamically adjusted; if, for example, the timer frequently expires causing multiple exits to the virtual-machine monitor for the same secure virtual-machine work request, the number of cycles of future timers may be increased. If, on the other hand, the timer rarely expires before the work queue 414 is empty, the number of cycles may be decreased for future timers.

The secure virtual machine is launched (608) on the processor by the hardware virtual-machine monitor 212, software virtual machine monitor 222, by the operating system 218, by the secure virtual machine manager component 402, or by any other system. In some embodiments, if the virtual machine is already running as a result of an earlier work request and/or interrupt intended therefore, the secure virtual machine is not re-launched. A SECURE_VM_RUNNING flag 410 may be set when the secure virtual machine is launched and cleared when it exits. Once the secure virtual machine is launched, it polls (610) the work queue 414 in the shared memory buffer for work to be executed by the secure virtual machine until the work queue 414 is empty or until the timer 408 expires. If the timer 408 expires before the work queue 414 is empty, additional requests may be submitted until the work queue 414 is empty. When the work queue 414 is empty or when the timer 408 expires, the task-priority register may be restored with the saved task-priority register priority 406.

Figure 7A:
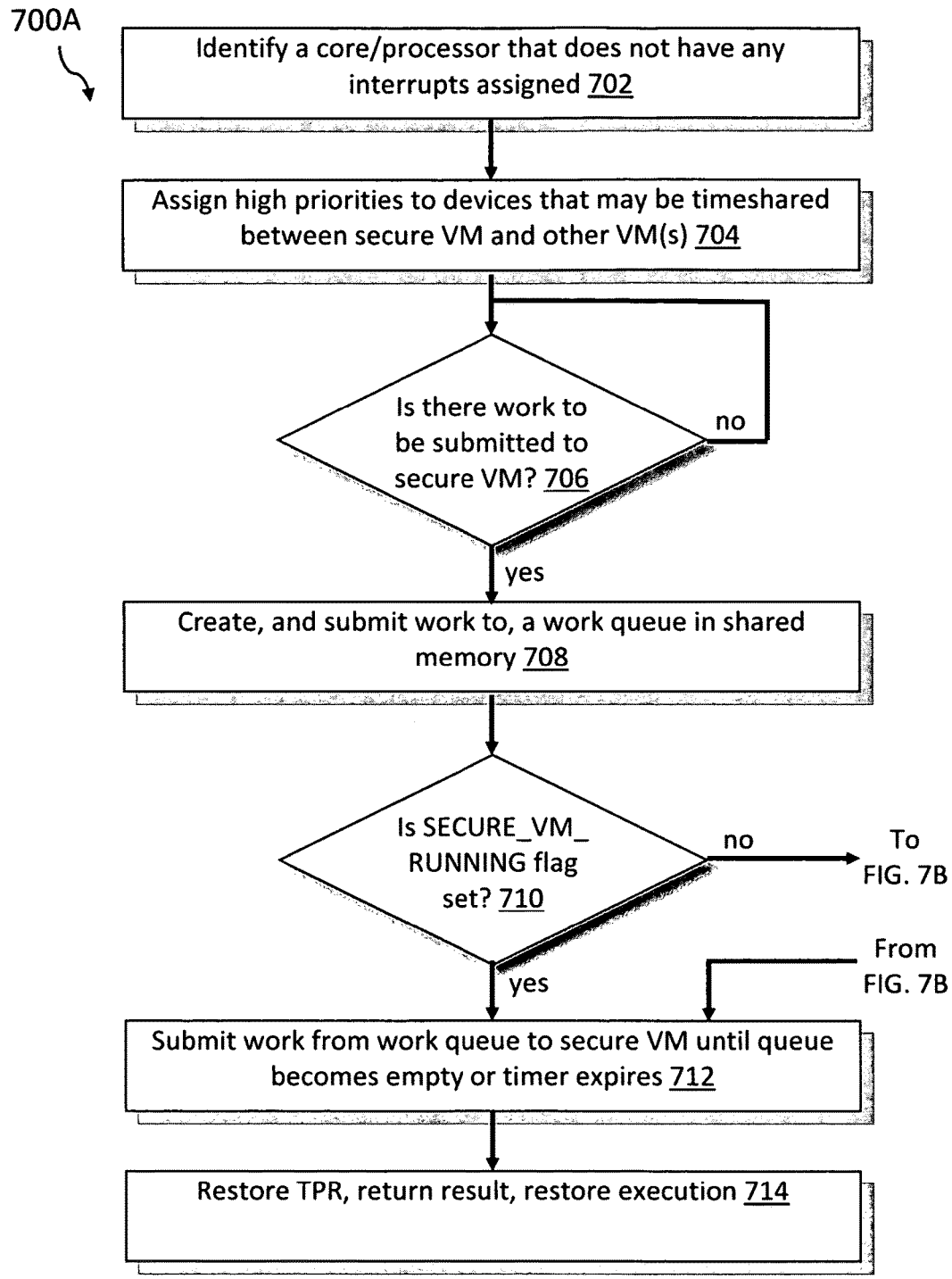
FIGS. 7A and 7B illustrate an exemplary method for handling secure virtual-machine interrupts.
Figure 7B:
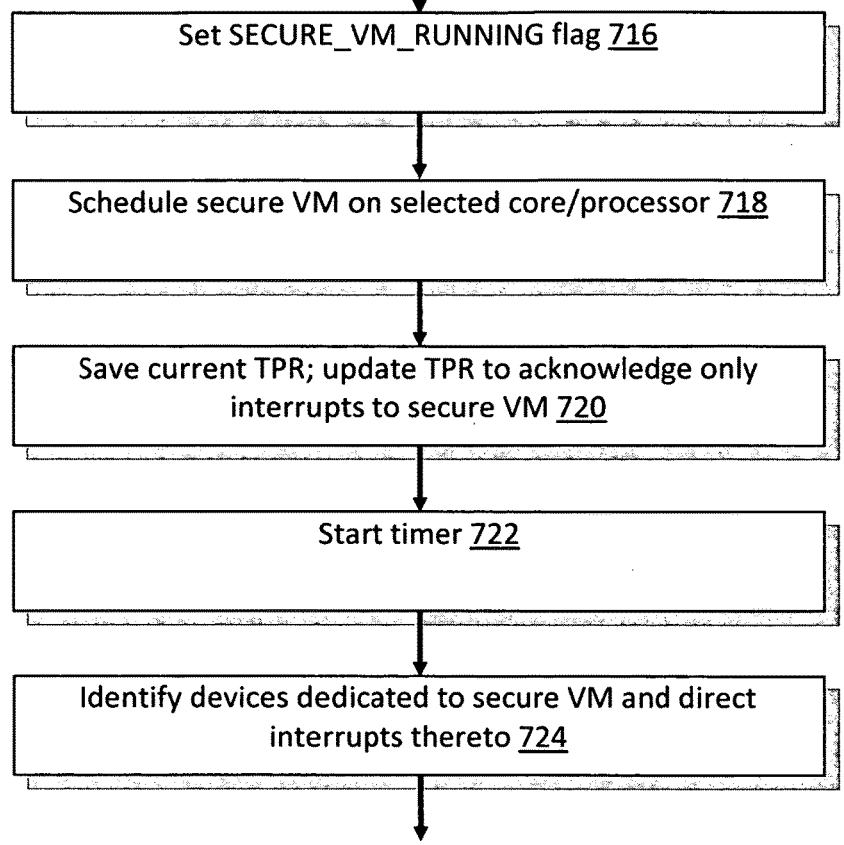

FIGS. 7A and 7B illustrate a flow diagram in accordance with embodiments disclosed herein and divided into two parts 700A, 700B across two drawing sheets. Referring first to the first part 700A of FIG. 7A, the flow diagram begins with identifying (702) a core or processor that does not have any interrupts assigned and assigning (704) high priorities to devices that may be timeshared between a secure virtual machine and other virtual machines. If there is work to be submitted (706) to a secure virtual machine (i.e., an interrupt and/or work request was received for the secure virtual machine, the flow 700A proceeds; if not, it awaits incoming work requests and/or interrupts. A work queue is created (708) in a shared memory, if necessary, and the received work is submitted thereto.

If the secure virtual machine is running (710) (i.e., the SECURE_VM_RUNNING flag is set), the flow 700A continues; if it is not, however, the flow proceeds to the flow 700B of FIG. 7B (as described below). Work is submitted (712) to the secure virtual machine from the work queue until the queue becomes empty or until the timer expires. In either event, the task-priority register is restored, the result of the work is returned, and execution is restored (714).

With reference to FIG. 7B, as mentioned above, the flow proceeds to the flow 700B if the secure virtual machine is not running. The SECURE_VM_RUNNING flag is set (716), and a secure virtual machine is scheduled (718) on a selected core or processor. The current task-protocol register is saved and updated (720) to have a new value, as described above, to acknowledge only interrupts intended for the secure virtual machine. The timer is started (722), and any devices dedicated to the secure virtual machine, such as a fingerprint reader, are identified (724) and interrupts and/or work requests therefrom are directed to the secure virtual machine.

The following examples pertain to further embodiments, from which numerous permutations and configurations will be apparent.

As used in this application, the terms "system" and "component" are intended to refer to a hardware and/or software device in which digital processing is carried out, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire device (e.g., an entire computer). One or more components can reside within a process and/or thread of execution, and a component may be localized on one device and/or distributed between two or more devices. Further, components may be communicatively coupled to each other by various types of communications media to coordinate operations.

It should also be noted that embodiments may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The following examples pertain to further embodiments, from which numerous permutations and configurations will be apparent.

Example 1 is an apparatus for secure virtual-machine interrupt handling comprising a computer processor; a computer memory in electrical communication with the computer processor and comprising a shared memory, the shared memory comprising a work queue configured to add work in accordance with a received work request for a secure virtual machine configured to execute on the computer processor; a timer configured to start when a work request is received and to expire after a number of cycles of the computer processor have elapsed thereafter; a task-priority register configured to filter interrupts directed toward the computer processor and to update, when a work request is received, to block interrupts not directed toward the secure virtual machine; and a secure virtual-machine interrupt manager component configured to launch the secure virtual machine on the computer processor and to poll a work queue in a shared memory buffer for work to be executed by the secure virtual machine until the work queue becomes empty or until the timer expires.

Example 2 includes the subject matter of example 1, where the task-priority register is further configured to save its current state before updating.

Example 3 includes the subject matter of example 2, where the task-priority register is further configured to restore its current state when the work queue becomes empty or when the timer expires.

Example include's the subject matter of example 1, where the secure virtual-machine interrupt manager is further configured to schedule the secure virtual machine on the computer processor.

Example 5 includes the subject matter of example 1, where the task-priority register is further configured to update by setting a priority threshold higher than a current priority threshold such that interrupts having a lower priority than the priority threshold are blocked.

Example includes the subject matter of example 1, where the task-priority register comprises being further configured to update by setting a first priority threshold higher than a current priority threshold and a second priority threshold higher than the first priority threshold such that interrupts having a lower priority than the first priority threshold and interrupts having a higher priority than the second priority threshold are blocked.

Example includes the subject matter of example 1, where the task-priority register is further configured to update by configuring a bitmap mask register to mask a set of interrupts.

Example 8 includes the subject matter of example 1, further comprising a SECURE_VM_RUNNING flag that is set when the secure virtual machine is started.

Example 9 includes the subject matter of example 1, where the number of cycles comprises 5,000, 10,000, or 50,000 cycles.

Example 10 includes the subject matter of example 1, where the secure virtual-machine interrupt manager component is further configured to assign a high priority to a device that is timeshared with the secure virtual machine and another virtual machine such that the updated task-priority register does not block interrupts from the device to the secure virtual machine but does block interrupts from the device to the virtual machine.

Example 11 includes the subject matter of example 1, where the work requests are originated from input/output devices.

Example 12 includes the subject matter of example 11, where the input/output devices comprise a fingerprint scanner, a display, a video driver, and a bus controller.

Example 13 includes the subject matter of example 1, where the secure virtual-machine interrupt manager is further configured to identify a device dedicated to the secure virtual machine and to direct all interrupts from the identified device to the secure virtual machine.

Example 14 includes the subject matter of example 13, where the device dedicated to the secure virtual machine comprises a fingerprint scanner.

Example 15 is a computer-implemented method for secure virtual-machine interrupt handling comprising adding work to a work queue in a shared memory buffer in accordance with a received request; updating a task-priority register to block interrupts not directed toward the secure virtual machine; starting a timer that expires after a number of cycles of the computer processor have elapsed; launching the secure virtual machine on the computer processor; and polling a work queue in a shared memory buffer for work to be executed by the secure virtual machine until the work queue is empty or until the timer expires.

Example 16 includes the subject matter of example 15, where the task-priority register is further updated to save its current state before updating.

Example 17 includes the subject matter of example 16, where the task-priority register is further updated to restore its current state when the work queue becomes empty or when the timer expires.

Example 18 includes the subject matter of example 15, further comprising scheduling the secure virtual machine on the computer processor.

Example 19 includes the subject matter of example 15, where the task-priority register is further updated by setting a priority threshold higher than a current priority threshold such that interrupts having a lower priority than the priority threshold are blocked.

Example 20 includes the subject matter of example 15, where the task-priority register is further updated by setting a first priority threshold higher than a current priority threshold and a second priority threshold higher than the first priority threshold such that interrupts having a lower priority than the first priority threshold and interrupts having a higher priority than the second priority threshold are blocked.

Example 21 includes the subject matter of example 15, where the task-priority register is further updated by configuring a bitmap mask register to mask a set of interrupts.

Example 22 includes the subject matter of example 15, further comprising a SECURE_VM_RUNNING flag that is set when the secure virtual machine is started.

Example 23 includes the subject matter of example 15, where the number of cycles comprises 5,000, 10,000, or 50,000 cycles.

Example 24 includes the subject matter of example 15, further comprising assigning a high priority to a device that is timeshared with the secure virtual machine and another virtual machine such that the updated task-priority register does not block interrupts from the device to the secure virtual machine but does block interrupts from the device to the virtual machine.

Example 25 includes the subject matter of example 15, where the work requests are originated from input/output devices.

Example 26 includes the subject matter of example 25, where the input/output devices comprise a fingerprint scanner, a display, a video driver, and a bus controller.

Example 27 includes the subject matter of example 15, further comprising identifying a device dedicated to the secure virtual machine and directing all interrupts from the identified device to the secure virtual machine.

Example 28 includes the subject matter of example 27, where the device dedicated to the secure virtual machine comprises a fingerprint scanner.

Example 29 is a tangible machine-readable storage medium comprising instructions that, when executed by a processing device, cause the processing device to add work to a work queue in a shared memory buffer in accordance with a received request; update a task-priority register to block interrupts not directed toward the secure virtual machine; start a timer that expires after a number of cycles of the computer processor have elapsed; launch the secure virtual machine on the computer processor; and poll a work queue in a shared memory buffer for work to be executed by the secure virtual machine until the work queue is empty or until the timer expires.

Example 30 includes the subject matter of example 29, further comprising the instructions causing the processing device to update the task-priority register being further updated to save its current state before updating.

Example 31 includes the subject matter of example 30, further comprising the instructions causing the processing device to restore a current state of the task-priority register when the work queue becomes empty or when the timer expires.

Example 32 includes the subject matter of example 29, further comprising the instructions causing the processing device to schedule the secure virtual machine on the computer processor.

Example 33 includes the subject matter of example 29, further comprising the instructions causing the processing device to update the task-priority register by setting a priority threshold higher than a current priority threshold such that interrupts having a lower priority than the priority threshold are blocked.

Example 34 includes the subject matter of example 29, further comprising the instructions causing the processing device to update the task-priority register by setting a first priority threshold higher than a current priority threshold and a second priority threshold higher than the first priority threshold such that interrupts having a lower priority than the first priority threshold and interrupts having a higher priority than the second priority threshold are blocked.

Example 35 includes the subject matter of example 29, further comprising the instructions causing the processing device to update the task-priority register by configuring a bitmap mask register to mask a set of interrupts.

Example 36 includes the subject matter of example 29, further comprising the instructions causing the processing device to set a SECURE_VM_RUNNING flag when the secure virtual machine is started.

Example 37 includes the subject matter of example 29, where the number of cycles comprises 5,000, 10,000, or 50,000 cycles.

Example 38 includes the subject matter of example 29, further comprising the instructions causing the processing device to assign a high priority to a device that is timeshared with the secure virtual machine and another virtual machine such that the updated task-priority register does not block interrupts from the device to the secure virtual machine but does block interrupts from the device to the virtual machine.

Example 39 includes the subject matter of example 29, where the work requests are originated from input/output devices.

Example 40 includes the subject matter of example 39, where the input/output devices comprise a fingerprint scanner, a display, a video driver, and a bus controller.

Example 41 includes the subject matter of example 29, further comprising the instructions causing the processing device to identify a device dedicated to the secure virtual machine and directing all interrupts from the identified device to the secure virtual machine.

Example 42 includes the subject matter of example 41, where the device dedicated to the secure virtual machine comprises a fingerprint scanner.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "including" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications, and variations that fall within the spirit and scope of the appended claims.

What is claimed is:

1. An apparatus for secure virtual-machine interrupt handling comprising:
   a computer processor;
   a computer memory in electrical communication with the computer processor and comprising a shared memory, the shared memory comprising a work queue configured to add work in accordance with a received work request for a secure virtual machine configured to execute on the computer processor;
   a timer configured to start when the work request is received and to expire after a number of cycles of the computer processor have elapsed thereafter;
   a task-priority register configured to filter interrupts directed toward the computer processor, wherein updated contents are stored in the task-priority register based on the received work request, the updated contents to cause the task-priority register to block interrupts not directed toward the secure virtual machine; and
   a secure virtual-machine interrupt manager component configured to launch the secure virtual machine on the computer processor, to poll the work queue in the shared memory for work to be executed by the secure virtual machine until the work queue becomes empty or until the timer expires, and, when the work queue becomes empty, to lower the number of elapsed cycles of the computer processor after which the timer expires or, when the timer expires, to increase the number of elapsed cycles of the computer processor after which the timer expires.

2. The apparatus of claim 1, wherein current contents of the task-priority register are stored in the computer memory as previous contents before the contents of the task-priority register are updated.

3. The apparatus of claim 2, wherein the updated contents of the task-priority register are replaced with the previous contents stored in the computer memory when the work queue becomes empty or when the timer expires.

4. The apparatus of claim 1, the secure virtual-machine interrupt manager being further configured to schedule the secure virtual machine on the computer processor.

5. The apparatus of claim 1, the task-priority register being further configured to update by setting a priority threshold higher than a current priority threshold such that interrupts having a lower priority than the priority threshold are blocked.

6. The apparatus of claim 1, the task-priority register comprises being further configured to update by setting a first priority threshold higher than a current priority threshold and a second priority threshold higher than the first priority threshold such that interrupts having a lower priority than the first priority threshold and interrupts having a higher priority than the second priority threshold are blocked.

7. The apparatus of claim 1, wherein the updated contents of the task-priority register comprises a bitmap, the task-priority register configured to filter interrupts directed toward the computer processor by masking the interrupts with the bitmap.

8. The apparatus of claim 1, further comprising a SECURE_VM_RUNNING flag that is set when the secure virtual machine is started.

9. The apparatus of claim 1, the number of cycles comprising 5,000, 10,000, or 50,000 cycles.

10. A computer-implemented method for secure virtual-machine interrupt handling comprising:
    adding work to a work queue in a shared memory in accordance with a received request;
    storing updated contents in a task-priority register based on the received request, the updated contents to cause the task-priority register to block interrupts not directed toward a secure virtual machine;
    starting a timer that expires after a number of cycles of a computer processor have elapsed;
    launching the secure virtual machine on the computer processor;
    polling the work queue in the shared memory for work to be executed by the secure virtual machine until the work queue becomes empty or until the timer expires; and
    when the work queue becomes empty, lowering the number of elapsed cycles of the computer processor after which the timer expires or, when the timer expires, increasing the number of elapsed cycles of the computer processor after which the timer expires.

11. The computer-implemented method of claim 10, comprising storing current contents of the task-priority register in a computer memory as previous contents before the updated contents are stored in the task-priority register.

12. The computer-implemented method of claim 11, comprising replacing the updated contents of the task-priority register with the previous contents stored in the computer memory when the work queue becomes empty or when the timer expires.

13. The computer-implemented method of claim 10, further comprising scheduling the secure virtual machine on the computer processor.

14. The computer-implemented method of claim 10, the task-priority register being further updated by setting a priority threshold higher than a current priority threshold such that interrupts having a lower priority than the priority threshold are blocked.

15. The computer-implemented method of claim 10, the task-priority register further updated by setting a first priority threshold higher than a current priority threshold and a second priority threshold higher than the first priority threshold such that interrupts having a lower priority than the first priority threshold and interrupts having a higher priority than the second priority threshold are blocked.

16. The computer-implemented method of claim 10, wherein the updated contents of the task-priority register comprise a bitmap, the task-priority register configured to filter interrupts directed toward the computer processor by masking the interrupts with the bitmap.

17. The computer-implemented method of claim 10, further comprising a SECURE_VM_RUNNING flag that is set when the secure virtual machine is started.

18. A non-transitory machine-readable storage medium comprising instructions that, when executed by a processing device, cause the processing device to:
add work to a work queue in a shared memory in accordance with a received request;
store updated contents in a task-priority register based on the received request, the updated contents to cause the task-priority register to block interrupts not directed toward a secure virtual machine;
start a timer that expires after a number of cycles of a computer processor have elapsed;
launch the secure virtual machine on the computer processor;
poll the work queue in the shared memory for work to be executed by the secure virtual machine until the work queue becomes empty or until the timer expires; and
when the work queue becomes empty, lower the number of elapsed cycles of the computer processor after which the timer expires or, when the timer expires, increase the number of elapsed cycles of the computer processor after which the timer expires.

19. The non-transitory machine-readable storage medium of claim 18, further comprising the instructions causing the processing device to store current contents of the task-priority register in a computer memory as previous contents before the updated contents are stored in the task-priority register.

20. The non-transitory machine-readable storage medium of claim 19, further comprising the instructions causing the processing device to replace the updated contents of the task-priority register with the previous contents stored in the computer memory when the work queue becomes empty or when the timer expires.

21. The non-transitory machine-readable storage medium of claim 18, further comprising the instructions causing the processing device to schedule the secure virtual machine on the computer processor.

22. The non-transitory machine-readable storage medium of claim 18, further comprising the instructions causing the processing device to update the task-priority register by setting a priority threshold higher than a current priority threshold such that interrupts having a lower priority than the priority threshold are blocked.

23. The non-transitory machine-readable storage medium of claim 18, further comprising the instructions causing the processing device to update the task-priority register by setting a first priority threshold higher than a current priority threshold and a second priority threshold higher than the first priority threshold such that interrupts having a lower priority than the first priority threshold and interrupts having a higher priority than the second priority threshold are blocked.

24. The non-transitory machine-readable storage medium of claim 18, wherein the updated contents of the task-priority register comprise a bitmap, and further comprising the instructions causing the processing device to filter interrupts directed toward the computer processor with the bitmap.

25. The non-transitory machine-readable storage medium of claim 18, further comprising the instructions causing the processing device to set a SECURE_VM_RUNNING flag when the secure virtual machine is started.

* * * * *